United States Patent [19]

Nagashima

[11] Patent Number: 4,701,808
[45] Date of Patent: Oct. 20, 1987

[54] IMAGE PROCESSING APPARATUS WITH VARIABLE MAGNIFICATION AND GRAY LEVEL PROCESSING

[75] Inventor: Nao Nagashima, Yokohama, Japan

[73] Assignee: Canon Kabushiki Kaisha, Tokyo, Japan

[21] Appl. No.: 664,539

[22] Filed: Oct. 25, 1984

[30] Foreign Application Priority Data

Nov. 1, 1983 [JP] Japan ................................. 58-206337
Nov. 1, 1983 [JP] Japan ................................. 58-206338

[51] Int. Cl.$^4$ ......................... H04N 1/40; H04N 1/04
[52] U.S. Cl. .................................... 358/287; 358/283; 358/280
[58] Field of Search ................. 358/287, 283, 280, 77, 358/298

[56] References Cited

U.S. PATENT DOCUMENTS 4,080,634 3/1978 Schreiber ............................. 358/287
4,475,127 10/1984 Iinuma ................................. 358/283

FOREIGN PATENT DOCUMENTS 1206681 9/1970 United Kingdom .
1495499 12/1977 United Kingdom .
1499501 2/1978 United Kingdom .
1542297 3/1979 United Kingdom .
1546359 5/1979 United Kingdom .
1549714 8/1979 United Kingdom .
2098022 11/1982 United Kingdom .
2120896 12/1983 United Kingdom .
2139454 11/1984 United Kingdom .

Primary Examiner—Howard W. Britton
Assistant Examiner—John K. Peng
Attorney, Agent, or Firm—Fitzpatrick, Cella, Harper & Scinto

[57] ABSTRACT

In image processing apparatus comprises image signal input means, variable magnification processing means for magnification-processing an input image signal inputted by the input means, and half-tone processing means for half-tone processing the image signal magnification-processed by the variable magnification processing means.

9 Claims, 7 Drawing Figures

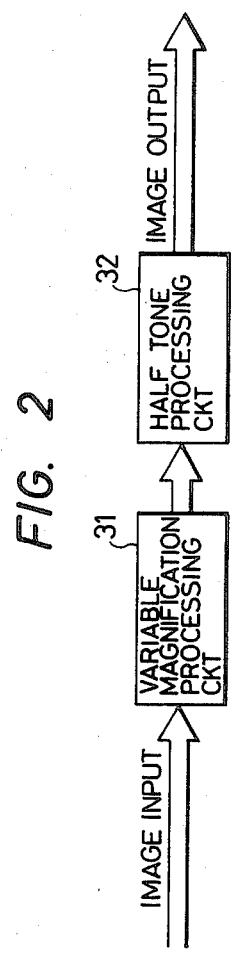
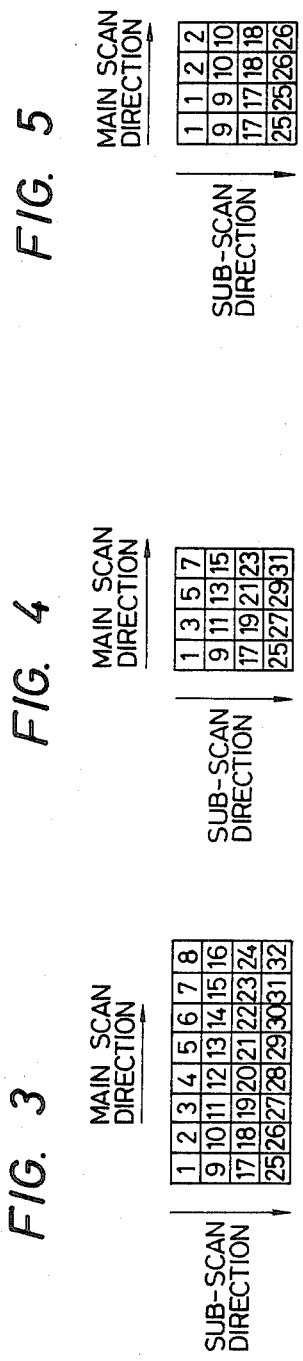
FIG. 2
FIG. 3
FIG. 4
FIG. 5

IMAGE PROCESSING APPARATUS WITH VARIABLE MAGNIFICATION AND GRAY LEVEL PROCESSING

BACKGROUND OF THE INVENTION

1. Field of the Invention

The present invention relates to an image processing apparatus for electrically processing image information.

2. Description of the Prior Art

When an original image is photoelectrically read and an image is recorded based on the read image signal, the image may be optically enlarged or reduced or a recording pixel density may be changed in recording the image. However, such methods are not advisable because they lead to an increase of the size and complexity of apparatus.

In the past, a digital image data handling apparatus did not need gray level processing. However, as the application field expands from a facsimile apparatus to a copying machine, demand for high quality of image increases and gray level processing is required to reproduce half-tone image such as a photograph.

In most gray level processing methods, a plurality of black and white dot images are blocked as is done in a dither method, and the gray level is reproduced in accordance with the number of black or white dot images in the block.

A variable magnification processing has been proposed, in which an image is enlarged or reduced by adding or taking out (interlacing) digital image data.

However, when the gray level processing is combined with the variable magnification processing, image quality may be degraded, as will be explained below. When the image data is gray-level processed by the dither method and the processed data is then magnified, a size of a predetermined size of pixel unit (pixel matrix) for reproducing the gray level changes and hence white/black areas per unit area change. As a result, a required tonality is not attained and the image is not reproduced with a correct density. That is, if the magnification processing is effected after the dither processing, the dither-processed pattern is destroyed and the reproducibility by the dither matrix is lost. In order to prevent this, the dither pattern may be changed or the dither output may be varied in accordance with magnification but this is not advisable because it complicates the circuit configuration and increases the size of the apparatus.

SUMMARY OF THE INVENTION

It is an object of the present invention to provide an image processing apparatus capable of reproducing a high quality of image.

It is another object of the present invention to provide an improved image processing apparatus havng a variable magnification processing function.

It is an other object of the present invention to provide an image processing apparatus capable of reproducing a high quality of image even when gray level processing and variable magnification processing are combined.

It is an other object of the present invention to provide an image processing apparatus capable of enlarging or reducing an image with a simple construction without causing complexity or increase of size of the apparatus.

The other objects and advantages of the present invention will be apparent from the following description and the appended claims.

BRIEF DESCRIPTION OF THE DRAWINGS

FIG. 2 is a block diagram of a basic portion of an image processing circuit, FIGS. 3 to 5 show image signal conditions.

DETAILED DESCRIPTION OF THE PREFERRED EMBODIMENTS

Figure 1:
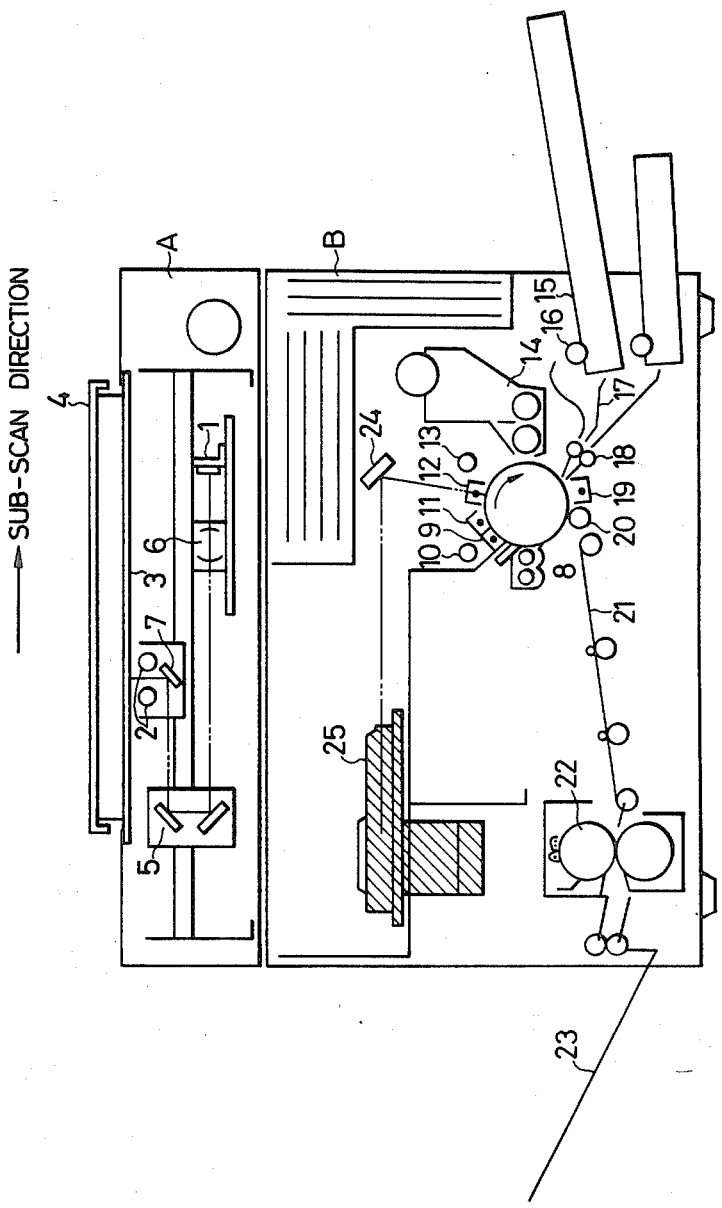
FIG. 1 shows a structure of a digital copying machine in accordance with the present invention.

FIG. 1 shows a structure of a digital copying machine in accordance with the present invention. A denotes a reader which photoelectrically converts an image of an original sheet to be copied, and B denotes a printer which forms an image on a recorded medium in accordance with the image signal from the reader A. In the reader A, the original sheet to be copied is mounted face-down on an original sheet glass 3. A mount reference position is located on a left inner side as viewed from the front. The original sheet is pressed to the original sheet glass by an original sheet cover 4. The original sheet is illuminated by a fluorescent lamp 2 and a light reflected from the original sheet is directed onto a surface of a CCD 1 through mirrors 5 and 7 and a lens 6. The mirror 7 and the mirror 5 are moved at relative velocity ratio of two. The optical unit is moved by a DC servo motor from left to right at a constant velocity with PLL being applied thereto. The velocity in a unity magnification mode is 180 mm/sec in a forward path in which the original sheet is illuminated, and 468 mm/sec in a return path. A resolution in a sub-scan direction is 16 lines/mm. A size of the original sheet processed ranges from size A5 to size A3, and an orientation for mounting the original sheet is longitudinal for the sizes A5, B5 and A4, and lateral for the sizes B4 and A3.

A main scan width is equal to a lateral dimension of 297 mm of the size A4 sheet. In order to attain the resolution of 16 pels/mm, the CCD 1 needs 4752 ($=297\times16$) bits. In the present apparatus, two 2688-bit CCD arrays are driven in parallel. From the conditions of 16 lines/mm and 180 mm/sec, a main scan period T (=storage time of the CCD) is given by $T=1/V\cdot n=1/180\times16=347.2$ μsec. A transfer speed f of the CCD is given by $f=N/T=2688/347.2$ μsec $=7.7419$ KHz.

Referring to FIG. 1, the printer B under the reader A is briefly explained. The bit-serial image signal processed by the reader A is supplied to a laser scan optical unit 25 of the printer B. The unit 25 comprises a semiconductor laser, a collimeter lens, a rotating polygon mirror, an F-$\theta$ lens and a correction optical system. The image signal from the reader A is applied to the semiconductor laser and electro-optically converted thereby. The resulting laser beam is collimated by the collimeter lens and directed to the polygon mirror rotating at a high speed so that the laser beam scans a photoconductor 8. The polygon mirror is rotated at 2600 rpm. A scan width thereof is approximately 400 mm and an effective image width is equal to the lateral dimension of 297 mm of the size A4 sheet. Thus, a signal frequency applied to the semiconductor laser is approximately 20 KHz (NRZ). The laser beam from this unit is directed to the photoconductor 8 through a mirror 24.

The photoconductor 8 may comprises three layers, a conductive layer, a photoconductive layer and an insulative layer. Process components for forming an image are arranged around the photoconductor 8. Numeral 9 denotes a pre-discharger, numeral 10 denotes a pre-discharge lamp, numeral 11 denotes a primary charger, numeral 12 denotes a secondary charger, numeral 13 denotes a flat exposure lamp, numeral 14 denotes a developing unit, numeral 15 denotes a paper cassette, numeral 16 denotes a paper feed roller, numeral 17 denotes a paper feed guide, numeral 18 denotes a regist roller, numeral 19 denotes a transfer charger, numeral 20 denotes a separation roller, numeral 21 dentoes a convey guide, numeral 22 denotes a fixing unit and numeral 23 denotes a tray. Velocities of the photoconductor 8 and the conveyer system are 180 mm/sec as is the case for the forward path of the reader A. Accordingly, a copy rate by the combination of the reader A and the printer B is 30 sheets/min for the size A4 sheet. The printer B uses a separation belt to separate the record paper from the photoconductor drum 8. Accordingly, a portion of the image corresponding to the width of the belt is dropped. If a signal is applied to this area, it is developed and the separation belt is contaminated by the toner and the record papers will also be contaminated. Accordingly, a portion of the video signal of the print output which corresponds to the width of 8 mm of the separation belt is blocked by the reader A. If toner is deposited on a leading edge of the record paper, the record paper will be wrapped around the fixing roller in a fixing cycle and causes a jam. Accordingly, a portion of the electric signal corresponding to a leading edge length of 2 mm of the record paper is blocked by the reader A to prevent the toner from being deposited.

The copying machine of the present embodiment has an intelligent function such as image edition. Such intelligence is attained in the reader A by processing the signal read by the CCD 1 and the output signal from the reader A always has a constant number (4752) of bits at a contstant rate. The intelligence functions may include enlargement/reduction function at any magnification between 0.5 and 2.0, trimming function for picking up an image of only disignated area, move function for moving a trimmed image to any place on a record paper and a function to recognize an original sheet mounted on the original sheet table. Other functions may be a half-tone processing function using a dither processing and an AE function. Further, a combined function of the above intelligent functions may be included.

FIG. 2 shows a block diagram of a circuit for effecting the variable magnification processing and the half-tone processing of the intelligent functions described above, to the image signal from the reader A which reads the original sheet. The serial image signal from the CCD 1 of the reader A is supplied to a variable magnification processing circuit 31 which effects the magnification processing to the image signal in accordance with a present magnification.

The magnification processing is effected in the main scan direction of the CCD 1. The enlargement at a factor of $\alpha(\alpha>1)$ is attained by sampling at a frequency of $A \times \alpha$ the image signal inputted pixel by pixel at a frequency A to expand the image data, and the reduction at a factor of $\beta(0 \leqq \beta < 1)$ is attained by sampling the image singal at a frequency of $A \times \beta$ to shrink the image data. The magnification in the sub-scan direction is attained by changing the sub-scan speed in the reader A in accordance with the magnification factor.

The image signal magnified by the variable magnification processing circuit 31 is supplied to the half-tone processing circuit 32. The signal is data having a predetermined number of bits including half-tone information (hereinafter called a multi-value signal). The half tone processing circuit 1 effects pseudo half-tone conversion processing using the binary and multi-value signals by a dither method to produce a binary signal.

FIGS. 3, 4 and 5 show image signals in the circuit shown in FIG. 2. FIG. 3 shows an image matrix on the original sheet of the image signal supplied from the CCD 1 to the variable magnification processing circuit 31. In the present embodiment, it is assumed that the half-tone processing circuit 32 uses a $4 \times 4$ dither matrix to reproduce 17 tones of half-tone image. Numerals 1-32 in the matrix of FIG. 3 indicate the pixel numbers in the pixel matrix and they correspond to numerals in the matrices shown in FIGS. 4 and 5.

In the reduction mode with the reduction factor of 0.5, the pixels in the main scan direction are taken out at a rate of one out of two in the magnification processing circuit 31. On the other hand, in the enlargement mode with the magnification factor of two, the pixels in the main scan direction are doubled in the magnification processing circuit 31. FIGS. 4 and 5 show $4 \times 4$ matrices for the dither processing the half-tone processing circuit 32 for the thinned or thickened image signal. The signal is then processed by the $4 \times 4$ dither matrix.

FIG. 4 shows a reduced image signal derived by thinning the original image data to fit to the $4 \times 4$ dither matrix, and FIG. 5 shows an enlarged image signal derived by thickening the original image data to fit to $4 \times 4$ dither matrix.

Thus, the magnification-processed and half-tone processed binary signal supplied from the half-tone processing circuit 32 to a succeeding stage processing unit such as a printer includes no change in the size of the dither matrix. In accordance with the circuit of FIG. 2, even if the image signal is magnification-processed after the half-tone processing, the size of the dither matrix does not change and the problem that the white/black areas per unit area signficantly change and the desired tonality is not attained is resolved. Namely, the image can be reproduced without destroying the dither-processed pattern.

Figure 6:
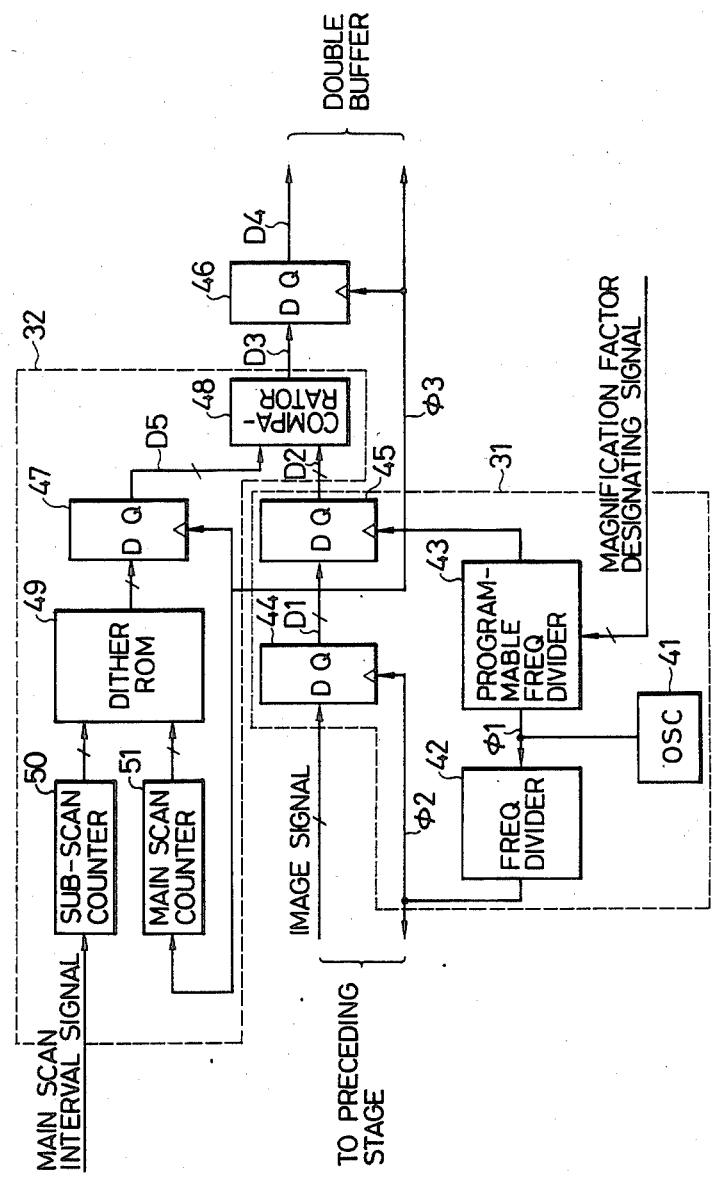
FIG. 6 shows a detailed circuit diagram of FIG. 2.

FIG. 6 shows a detailed configuration of the circuit shown in FIG. 2. Numerals 31 and 32 designate the magnification processing circuit and the half-tone processing circuit shown in FIG. 2.

In the magnification processing circuit 31, an oscillator 41 generates a fundamental clock $\phi 1$ for the magnification operation. The clock $\phi 1$ is frequency-divided by a frequency divider 42 and an output therefrom is used as a clock $\phi 2$ for a preceding stage circuit (not shown) which sends out the image data. The preceding stage circuit may be and A/D converter which converts the analog output of the line image sensor such as CCD 1 to a digital signal. The preceding stage circuit produces the image signal of a predetermined number of bits for each pixel in synchronism with the clock $\phi 2$. The image signal is reshaped by a D flip-flop 44 An output signal D1 of the D flip-flop 44. is applied to a next stage D flip-flop 45 where it is sampled by a clock $\phi 3$ and an output signal D2 is produced.

The clock $\phi 3$ is derived by frequency-dividing the clock $\phi 1$ by a programmable frequency divider 43 in accordance with a magnification designating signal. The programmable frequency divider 43 may be TI SN 7497 or SN 74167. The magnification designating signal for controlling the frequency division factor may be selected by switches, or varied by a microcomputer. The D flip-flops 44 and 45 may be TI SN74LS74A, and the frequency divider 42 may be a counter such sa TI SN74LS161 or the same IC as used for the programmable frequency divider 43 with a fixed frequency division factor. Thus, the magnification processing circuit 31 has the oscillator for generating the clock frequency $\phi 1$ higher than the clock frequency $\phi 2$ for inputting the image signal and the clock frequency $\phi 1$ is frequency-divided in accordance with the magnification factor to produce the clock $\phi 3$ which is used in the magnification processing. Accordingly, any magnification factor can be attained.

The output signal D2 of the D flip-flop 45 is supplied to a comparator 48 in the half-tone processing circuit 32. The comparator 48 also receives a threshold signal D5 from a D flip-flop 47. The threshold signal D5 and the output signal D2 are compared to produce a binary signal D3. The threshold signal D5 is read from a dither ROM 49 addressing a dither matrix contained in the dither ROM 49 by counts of a sub-scan counter 50 and a main scan counter 51. The threshold signal D is then synchronized with the output of the D flip-flop 45 by the D flip-flop 47.

The sub-scan counter 50 counts a main scan interval signal supplied from the preceding stage circuit. The main scan interval signal is produced for each scan of the CCD 1. Thus, the sub-scan counter 50 counts the number of sub-scan lines in the reader A and the main scan counter 51 counts the clock $\phi 3$ supplied from the programmable frequency divider 43 of the magnification processing circuit 31.

The clock $\phi 3$ from the programmable frequency divider 43 of the magnification processing circuit 31 is also supplied to D flip-flop 47. Since the D flip-flop 45 of the magnification processing circuit 31 is also driven by the clock $\phi 3$ from the programmable frequency divider 43, the two inputs D2 and D5 to the comparator 48 are synchronous. The sub-scan counter 50 and 51 may be TI SN74LS191, the dither ROM 49 may be Intel 2716, the comparator 48 may be TI SN74LS85, and the D flip-flop 47 may be TI SN74LS74A.

The binary signal D3 from the comparator 48 is synchronized with the clock $\phi 3$ by the D flip-flop 46 and supplied to a succeeding stage double buffer (not shown). Since the period of the clock $\phi 3$ is variable with the magnification designating signal as described above, the double buffer temporarily stores the binary signal and supplies it to the printer at a predetermined rate.

Figure 7:
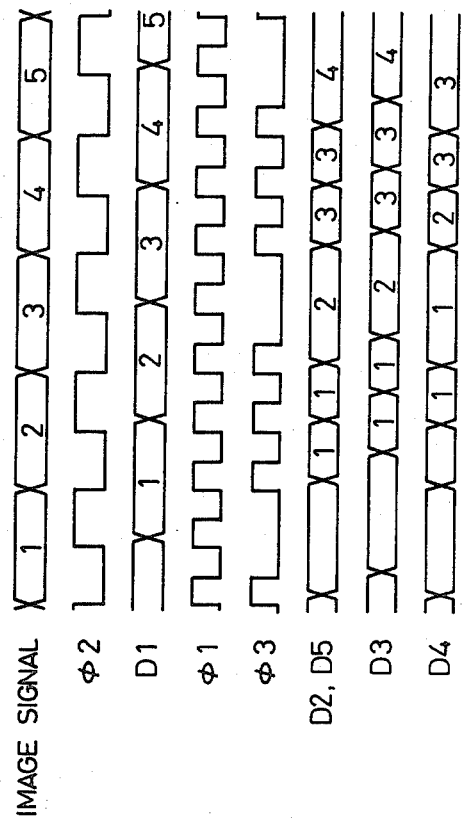
FIG. 7 shows signals at various points in FIG. 6.

Referring to a time chart of FIG. 7, the operation is explained in further detail.

FIG. 7 shows the clocks $\phi 1$–$\phi 3$ and the signals D1–D5 in FIG. 6. It is assumed that the frequencies of the clocks meet relations of clock $\phi 1 = 2 \times$ clock $\phi 2$, and clock $\phi 1 \geq$ clock $\phi 3 \geq 0$. FIG. 7 shows a timing when clock $\phi 3 = 0.75 \times$ clock $\phi 1$.

The image signal is produced in the sequence of numbers indicated in the drawing in synchronism with the clock $\phi 2$ from the frequency divider 42. It is reshaped by the D flip-flop 44 to produce the output signal D1.

The programmable frequency divider 43 sets its frequency division factor control line such that the clock $\phi 1$ is frequency-divided by a factor of 0.75 so that the clock $\phi 3$ shown is produced.

The output signal D1 is sampled by the D flip-flop 45 using the clock $\phi 3$ to produce the output signal D2. Assuming that one period of the clock $\phi 3$ corresponds to one image data, the output signal D2 has 1.5 times as much data volume as that of the input image signal D1 because the image signals 1, 3, 5, . . . are sampled twice. Accordingly, the output signal D2 is expanded by the factor of 1.5 in the main scan direction.

In the reduction mode, the clock frequencies are selected such that clock $\phi 3 <$ clock $\phi 2$, and in the unity magnification mode, the clock frequencies are selected such that clock $\phi 3 =$ clock $\phi 2$.

On the other hand, as described above, the threshold signal D5 for the binarization processing is supplied from the dither ROM 49 through the D flip-flop 47 in synchronism with the magnification-processed output signal D2. The threshold signal D5 are sequentially produced to correspond to the data of the output signal D2. The comparator 48 compares the output signal D2 with the threshold signal D5 and supplies the binary signal D3 to the D flip-flop 46 at the timing of FIG. 7. The clock $\phi 3$ is also supplied to the D flip-flop 46 and the binary signal D4 is supplied to the succeeding stage double buffer as shown in FIG. 7.

While a digital copying machine is described in the present embodiment, the present invention is applicable to other image processing apparatus such as facsimile, image file and microfilm reader.

While the present embodiment uses the comparator 48 for dither processing, other dither processing method may be used. For example, the image signal is applied to the ROM as an address data to produce "1" and "0" binary data. The present invention can be applied to other half-tone processing than the dither processing, for example a density pattern method.

The present invention is not limited to the illustrated embodiment but various modifications may be made within a scope of the appended claims.

What I claim is:

1. An image processing apparatus comprising:
input means for inputting a digital image signal transferred in accordance with a clock of a predetermined frequency;
variable magnification processing means for magnification-processing the digital image signal by using a sampling clock of a frequency different from the predetermined frequency, said sampling clock corresponding to a variable magnification; and
half-tone processing means for half-tone processing the digital image signal magnification-processed by said variable magnification processing means.

2. An image processing apparatus according to claim 1, wherein said variable magnification-processing means includes oscillation means for generating a clock having a higher frequency than the predetermined frequency, and sampling clock generating means for frequency-dividing the clock of said oscillation means in accordance with a magnification factor to generate the sampling clock for the digital input image signal.

3. An image processing apparatus according to claim 1, wherein said half-tone processing means includes dither processing means for dither-processing said magnification-processed image signal.

4. An image processing apparatus according to claim 3, wherein said dither processing means includes means for generating a threshold signal and means for comparing the magnification-processed digital image signal with the threshold signal to produce a binary signal.

5. An image processing apparatus according to claim 2, wherein said half-tone processing means includes means for generating a threshold signal for half-tone processing the magnification-processed digital image signal, the threshold signal being generated in synchronism with the sampling clock.

6. An image processing apparatus comprising:
- input means for inputting a digital image signal transferred in accordance with a clock of a first predetermined frequency;
- variable magnification processing means for magnification-processing the digital input image signal inputted by said input means, said variable magnification processing means including oscillation means for generating a clock having a second predetermined frequency and sampling clock generating means for frequency-dividing the clock of said oscillation means in accordance with a magnification factor to generate a sampling clock for the digital input image signal; and
- half-tone processing means for half-tone processing the digital image signal magnification-processed by said variable magnification processing means, in synchronism with the sampling clock.

7. An image processing apparatus according to claim 6, wherein said half-tone processing means includes dither processing means for dither processing the magnification-processed digital image signal.

8. An image processing apparatus according to claim 7, wherein said dither processing means generates a threshold signal in synchronism with the sampling clock.

9. An image processing apparatus according to claim 6, wherein said half-tone processing means includes means for generating a threshold signal for half-tone processing the magnification-processed image signal, the threshold signal being generated in synchronism with the sampling clock.

* * * * *